(12) United States Patent
Wheeler et al.

(10) Patent No.: US 6,556,273 B1
(45) Date of Patent: Apr. 29, 2003

(54) SYSTEM FOR PROVIDING PRE-PROCESSING MACHINE READABLE ENCODED INFORMATION MARKINGS IN A MOTION PICTURE FILM

(75) Inventors: Christopher E. Wheeler, Fairport, NY (US); Gary W. Ahlquist, Webster, NY (US); Wayne K. Shaffer, Penfield, NY (US); Roger A. Morton, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 43 days.

(21) Appl. No.: 09/709,099

(22) Filed: Nov. 10, 2000

Related U.S. Application Data (60) Provisional application No. 60/165,071, filed on Nov. 12, 1999.

(51) Int. Cl.⁷ .............................................. G03B 21/50
(52) U.S. Cl. ........................................................ 352/92
(58) Field of Search ............................ 352/44, 92, 129, 352/130, 170; 396/207, 210

(56) References Cited

U.S. PATENT DOCUMENTS

| | | | |
|---|---|---|---|
| 3,827,802 A | | 8/1974 | Pfeifer et al. |
| 3,977,776 A | * | 8/1976 | Wagensonner et al. ..... 352/171 |
| 3,999,992 A | * | 12/1976 | Van Paesschen et al. ... 427/130 |
| 4,003,743 A | | 1/1977 | Akashi et al. |
| 4,150,882 A | | 4/1979 | Konick |
| 4,279,945 A | | 7/1981 | Audran et al. |
| 4,341,855 A | | 7/1982 | Morrison et al. |
| 4,503,135 A | * | 3/1985 | Drexler .................... 346/135.1 |
| 4,627,695 A | * | 12/1986 | Beauviala et al. .......... 352/136 |
| 4,736,215 A | * | 4/1988 | Hudspeth et al. ........... 396/207 |
| 4,854,696 A | * | 8/1989 | Guez ..................... 219/121.68 |
| 4,965,627 A | | 10/1990 | Robison |
| 4,977,419 A | | 12/1990 | Wash et al. |
| 5,023,642 A | * | 6/1991 | Pagano ........................ 396/210 |
| 5,548,359 A | * | 8/1996 | Wakabayashi ............... 396/207 |
| 5,633,127 A | | 5/1997 | Nair et al. |
| 5,745,637 A | | 4/1998 | Phillips et al. |
| 5,930,445 A | | 7/1999 | Peters et al. |
| 5,968,719 A | * | 10/1999 | Nakamura ................. 346/107.1 |
| 5,981,155 A | * | 11/1999 | Vercruysse et al. .......... 430/363 |
| 6,095,417 A | | 8/2000 | Ahlquist et al. |
| 6,326,590 B1 | | 12/2001 | Shaffer et al. |
| 6,400,389 B1 | | 6/2002 | Shaffer et al. |
| 6,422,702 B1 | * | 7/2002 | Uhlig et al. ................. 352/172 |

FOREIGN PATENT DOCUMENTS

| | | |
|---|---|---|
| FR | 2621137 | 9/1987 |
| WO | 92/20009 | 11/1992 |

OTHER PUBLICATIONS

"DATAKODE Magnetic Control Surface", Eastman Kodak Company, 1983 (Publication No. V3–517).

* cited by examiner

*Primary Examiner*—Alan A. Mathews
*Assistant Examiner*—D. Ben Esplin
(74) *Attorney, Agent, or Firm*—Andrew J. Anderson (57) ABSTRACT

A system for providing motion picture photographic film with encoded information, such as unique film footage and frame identification, which can be machine read prior to film processing. This system provides machine readable encoded information markings on the raw stock film which may be read in a camera or other photoprocessing device with a reader prior to or concurrent with the film image capture process. The machine readable encoded information markings may be easily converted into a "video image" for display in a real time video from a CCD imager in the film camera or other device. Furthermore this pre-processing machine readable encoded information may be used in conjunction with optical latent image recorded information which becomes machine or human readable after processing as presently provided by film manufacturer's according to industry standards.

22 Claims, 7 Drawing Sheets

SYSTEM FOR PROVIDING PRE-PROCESSING MACHINE READABLE ENCODED INFORMATION MARKINGS IN A MOTION PICTURE FILM

CROSS REFERENCE TO RELATED APPLICATIONS

Reference is made to and priority claimed from U.S. Provisional application Ser. No. U.S. 60/165,071, filed Nov. 12, 1999, titled "A System For Machine Readable Keycode In A Motion Picture Process".

FIELD OF THE INVENTION

This invention generally relates to a system for and method of recording and retrieving a machine readable image on unprocessed motion picture film stock. In a particular embodiment, this invention specifically relates to motion picture and television film production systems where the machine readable image contains specific film footage and frame identification information pertinent to the latent image on the film.

BACKGROUND OF THE INVENTION

In motion picture feature and television production, many stages of the photographic imaging process are necessary to progress from the image capture stage until the final edited product is ready for distribution. In order to better explain modem editing processes, it is important to understand how film is manufactured and some basic procedures required in the actual production or shooting phase. Motion picture film is manufactured by coating a transparent support material with light sensitive emulsion layer(s), and an opaque antihalation layer coated either as a dyed layer between the light sensitive emulsion and the support or a pigmented or dyed layer on the side of the support opposite to the light sensitive emulsion. Many camera origination films employ a carbon black containing backing "remjet" layer as the antihalation layer. There are perforated sprocket holes at the edges of the film to allow for sprocket drives to pull the film through the motion picture cameras, printers, editing machines and projectors. Depending on the type of emulsion used, a positive or negative image (in color or black and white) will be produced on the film when it is properly exposed in the camera and subsequently processed at the film laboratory, wherein the antihalation layer is either removed (in the case of carbon black containing backing layers) or the dyes thereof rendered substantially colorless. Most all professional film production uses negative type film.

Once the original camera negative film is processed, the laboratory will then make a positive print of this film so that it may be viewed and edited. This print may be variously called the work print, direct print, or answer print. Upon completion of the editing process, the edited workprint is sent to a film cutter who will take the original camera negative or a print from the negative and cut it up to match the edited workprint. Positive prints, called release prints, can then be generated from this cut film and used for projection and/or transferred to videotape for showing on TV.

A key point in the editing process is the generation of an edit decision list (EDL) which provides specific negative film product and emulsion codes, footage and frame count information to the negative cutter to conform the negative images in the sequences desired for the end product. Because of the desire to maintain handling of the film at a minimum, and the importance of an exact frame reference as input to the film cutter, it is imperative that the EDL contain accurate references to the image frame identification on the film to be cut. In order for the film to be cut to exactly match up to the edited workprint, the film cutter relies on encoded information written near the edge of the film, such as the Eastman Kodak KEYKODE number. Such encoded information is typically provided by film manufacturers during the manufacturing process in the form of both human readable (e.g., alphanumeric characters) and machine readable (e.g., standard bar-code USS 128) images on the raw stock camera negative as a means of accurate frame identification. Written near the edge of the film, these human- and machine-readable alphanumeric and bar-code systems provide information on film code and emulsion identification, as well as unique film footage and frame counts corresponding to the images on the film. An industry standard for this encoded information system exists and this system is conventionally used in the motion picture production chain.

Currently, encoded information such as KEYKODE numbers are written in the form of latent images by exposing the photosensitive layer(s) of the film stock at regular intervals near the edges of the film during the manufacturing process, outside the intended picture area of the film according to SMPTE (Society of Motion Picture and TV Engineers) standards (e.g., Standard ANSI/SMPTE 271-1994 (16 mm), ANSI/SMPTE 254-1992 (35 mm) and ANSI/SMPTE XXX-YYYY (65 mm)), typically using a laser or light emitting diode (LED) device to form a latent image. Upon photographic processing, the latent images are developed to generate optical human (e.g., alphanumeric) and/or machine (e.g., bar-code) readable dye or silver images. There are specially designed film bar-code readers that the editor and negative cutter can utilize to read KEYKODE numbers. Among other things, the KEYKODE number acts as a roll and frame counter, by which any frame of a production may be absolutely identified. KEYKODES provide information on film code and emulsion identification, as well as unique film footage and frame counts corresponding to the images on the film. The encoded information can then be used in the editing, color timing and telecine transfer processes to identify and select frame positions for splicing, color timing changes such as printer light changes, fades and dissolves, and sound synchronization points in an on-line or off-line film editing system. Importantly, film stock that the film laboratory uses to make the positive workprint does not contain these KEYKODE numbers, rather they are printed through from the processed original camera negative along with the main picture image.

The motion picture film latent image encoded information system is well-known in motion picture processing and provides very valuable information for the editing and color timing processes. This system is useful for providing a frame search, identification and orientation process to make reliable and accurate cuts when performing on-line, off-line telecine edits and final negative cutting edits. Furthermore, with the manufacturer's ID information incorporated into the encoded information, tracking information is retained in the film should it be necessary in the future.

Figure 1:
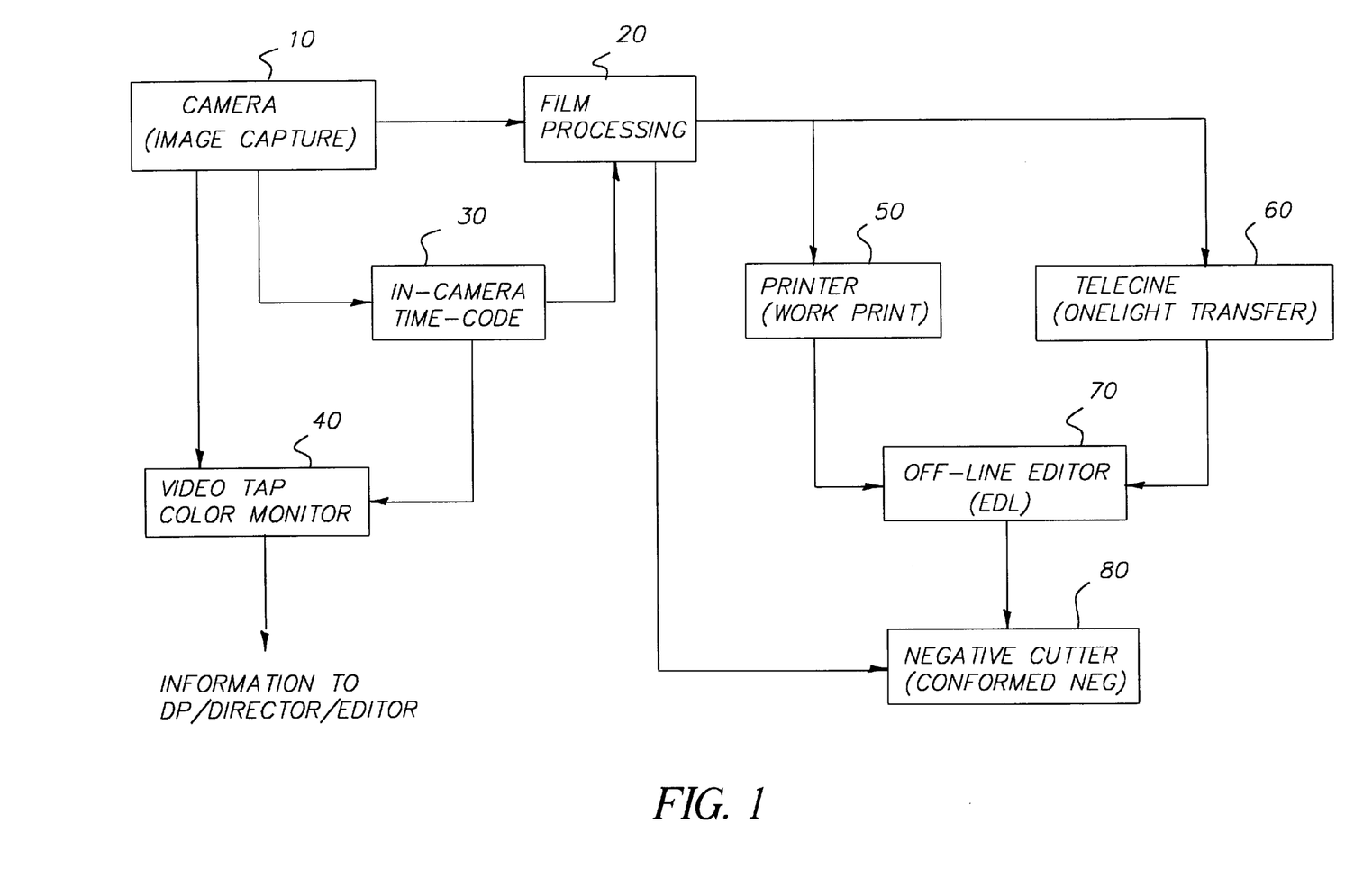
FIG. 1 depicts a simplified representation of a typical process flow diagram for motion picture film production and post production stages.

A simplified representation of a typical process flow diagram for motion picture film production and post production stages is shown in FIG. 1. Camera origination film is exposed in a motion picture camera in Image Capture Stage 10. With the current film system as discussed above, the manufacturer latent image written encoded (human and machine readable) information is neither readable nor usable until the film has been processed in Film Processing step 20. Although a video tap in the camera can provide an image to an on set Video Tap Color Monitor 40 for the cinematographer and director to review, there is no exact footage and frame reference corresponding to this image that was provided from the unprocessed camera negative film. Hence, this monitor image can be used only for general evaluation of a take and not for producing a final or rough EDL of what negative footage is most desirable. Rather, the latent image recorded encoded information is typically transferred from the processed negative film to a work print or intermediate film in a optical Printer 50, or read from the processed negative in a Telecine transfer device 60, and the EDL is then prepared upon review of the work print or telecine transfer at Off-Line Editor stage 70. The EDL is then supplied to Negative Cutter stage 80. This is a major limitation with the current latent image encoded information system. Because the human and machine readable images are not available until after processing, there is no method to accurately begin the editing process by corresponding the images on an on set monitor (via the video tap) to the actual frames for cutting, fading, dissolving etc. Another limitation of this process is in the use of special effects shooting, where it is essential to exactly match specific frames for instance when shooting background and matte exposures.

There exists methods to write an in-camera timecode to provide synchronization between image frames recorded on multiple cameras and/or sound recording devices, such as illustrated in box 30 of FIG. 1. Time-code systems provide some of the information useful to motion picture film post production processes, but not all. Originally developed for the video market, timecode methods have been implemented to allow for simpler post production sound and image synchronization, especially for multi-camera film capture. Conventional systems of this type include both standard timecode systems such as the SMPTE timecode and proprietary systems such as AAtoncode™ (Aaton, Inc., Grenoble, France) and FIS™ (Arri, Munich, Germany). While these systems are not identical, they all operate on the same basic principle, keeping very accurate real or relative time synchronization when using multiple cameras and audio (DAT) and video tape recorders. For film, these systems write a machine-readable code that synchronizes each frame of a motion picture negative with a real or relative time and footage stamp. Some time-code systems also periodically write reference marks and human-readable timecode to the film. This time-code, written as a latent image to the image layers of the film by an LED or similar type of device, becomes a permanent part of the negative film once it is developed. Both the machine and human-readable time-code images can thereby be used in the editing process, making it easier to find, edit and synchronize sound and images recorded from different devices.

Unfortunately there are some inherent limitations with the in-camera written time-code systems. First, there is no robust and accurate reference between the in-camera written time-code and the manufacturer's optically written latent image encoded information. Hence, the two systems do not allow for easy cross referencing to provide editing information from the timecode display in the video tap or the tape transfer from the telecine to provide exact film frame identification for the images on the negative. This cross-referencing can only be achieved after machine reading the optically recorded information from the processed film on a bar-code reader in a telecine or off-line editor and deriving an EDL from these identifiers. Second, due to the fact that the time-code information is written in-camera, it is subject to variations in exposure conditions of the writing device which can yield unreadable images if not adjusted properly for the correct film speed in the camera, an adjustment that may be needed every time the film stock in the camera is changed. Furthermore, there is much reluctance by personnel in the production process to use this system because of 1) lack of verification that the system is indeed recording to the film properly, 2) lack of understanding of the electronic devices required to synchronize the audio recorders and cameras, 3) unclear definition of who is responsible for the systems operation on the set and 4) general aversion to "another" tool on the set whose benefit appears to be limited to multiple camera and sound synchronization, two quite specific and limited applications.

The use of magnetic recording stripes or layers in photographic elements has been previously disclosed. An innovation in data communication between different stages of film use and processing for motion picture film was introduced as described in the publication "DATAKODE Magnetic Control Surface" by Eastman Kodak Company 1983 (Publication No. V3-517). A layer approximately 5 $\mu$m thick containing magnetic oxide particles was coated across the entire back surface of a roll of motion picture film to provide the capability to magnetically record digital data on the film without interfering with normal photographic use of the film. It has been suggested that this permitted recording of different types of digital data at different stages of production of a motion picture which allowed for information exchange such as camera, lighting and filter data at the time of shooting to printer exposure control information in the laboratory to theater automation control signals during exhibition. By incorporating magnetic heads in cameras, processors, telecine apparatus, and other processing equipment, machine readable information can be transferred along with the film. This machine-readable information can include information such as the specific film footage and frame identification information which could be read and encoded in a reader in the camera. The use of magnetic recording strips or layers on motion picture films for recording and playing back audio information has also been disclosed, such as in U.S. Pat. Nos. 4,003,743, 4,279,945, 4,341,855, 5,633,127. More recently, it has been proposed to employ a virtually transparent magnetic layer on still photography filmstrip to allow for magnetic recording of data in one or more longitudinal tracks associated with individual film image frames for information exchange purposes as part of the recently introduced Advanced Photo System. An example of such a system is described in commonly assigned U.S. Pat. No. 4,965,627 issued Oct. 23, 1990. In order to provide quick access to particular data at any stage of film use, related data is preferably grouped and recorded in specific predetermined tracks. Camera data is recorded in several dedicated longitudinal tracks located along the filmstrip edges. The data is preferably recorded in pulse position encoded form in order to be largely independent of film transport velocity. Magnetics On Film (MOF) systems, however, are complex to manufacture and are therefore extremely costly. MOF use requires manufacture of the film support (base) in a manner that is substantially more complex than is used in present manufacturing systems. Additionally, use of MOF technology requires that numerous manufacturers incorporate magnetic read/write heads on various equipment used throughout the production and post production processes.

Laser ablation is used commonly in the sub-titling of motion picture distribution prints, wherein after printing and photographic processing the emulsion layer of a print is selectively ablated (typically with an Argon type laser) to produce different language subtitles. There is no known previous use of ablation marking of light sensitive camera origination films for any purpose.

It would be desirable to provide an improved encoded information marking system which would allow for accurately corresponding the images provided on an on set monitor (e.g., via a camera video tap) to the actual frames of the camera film being exposed so that, e.g., the editing process (e.g., decisions for cutting, fading, dissolving, etc.) may be started based upon the viewed video images, which is currently not possible as readable images provided by the current latent image marking system are not available until after processing. Another limitation of the current system is in the use of special effects shooting, where it is essential to exactly match specific frames for instance when shooting background and matte exposures. A system for and method of recording and retrieving a machine readable image on unprocessed motion picture film stock would also be useful in enabling film in a given camera to be interchanged with another film type and re-threaded to a given spot—for example the position to where the film has been exposed. Such a system may also prevent confusion when different film types are being used in the same camera. Such a system would also be useful to provide specific film information such as exposure characteristics, tone scale, grain, resolution MTF, reciprocity characteristics, halation, latent keeping, and other information. In fact, overall this capability would provide for a more reliable and better controlled photographic and cinematographic capture process.

SUMMARY OF THE INVENTION

In accordance with one embodiment of the invention, a camera origination photographic film is described wherein the film comprising pre-processing readable encoded information markings recorded thereon. In accordance with a further embodiment of the invention, a system for encoding motion picture film with information for use in a motion picture camera is described such that the camera can read the encoded information when the film is in the camera, comprising (i) camera origination film having pre-processing readable encoded information markings thereon and (ii) a motion picture camera having an encoded information reader for reading the pre-processing readable encoded information markings. A method for encoding motion picture photographic film with pre-processing machine readable encoded information is also described, comprising physically marking the film with encoded information using laser ablation, inkjet printing, or holographic or binary optic embossing techniques. In preferred embodiments of the invention, the pre-processing readable encoded information markings comprise bar-code markings on the film which may be read with a bar-code reader. In accordance with a further embodiment of the invention, a method for recording synchronized pre-processing readable marks and latent image marks in a photographic film which comprises a transparent support, an emulsion layer coated on one side of the support, and an opaque backing layer on the opposite side of the support is also described, the method comprising (i) laser ablation marking the backing layer to form a pre-processing readable mark, and (ii) exposing the emulsion layer through the transparent support using the ablation marking of the backing layer as a mask to form a latent image in the emulsion layer which corresponds to the ablation marking in the backing layer, which latent image becomes readable after photographic processing.

DETAILED DESCRIPTION OF THE INVENTION

This invention provides a method to write machine readable encoded information markings, such as, e.g., a one or two dimensional bar-code, on unexposed film in a manner which allows the encoded information markings to be read prior to film processing. The invention provides a method(s) for writing machine readable code during the film manufacturing (specifically the film perforation or slitting) process. This code, presented in a bar-code format, may include information presently contained in the latent imaged machine readable KEYKODE, which is written to the film in a manner such that an appropriate machine reader mounted in a typical motion picture film camera can interpret the bar-code information and convert it into a digital signal. This digital signal can then be sent to a video monitor through the camera "video tap" or a similar transmission method such that the KEYKODE and/or other film information encoded in the bar-code can be decoded and viewed in human readable format in conjunction with the video tap image. This information can then be used with the image on the monitor by the director or others on the set to actually develop a rough EDL, or per-form other operations such as select appropriate filters or adjust the camera exposure or film development process. The ability do develop an EDL in the upfront stage of the process directly from the camera video tap image can result in a large reduction in post production editing time and hence monetary expenditure.

The invention may also be used to provide specific film information in the form of pre-processing readable encoded marks, such as exposure characteristics, tone scale, grain, resolution MTF, reciprocity characteristics, halation, latent keeping, and other information. For example, the latent and shelf life characteristics of the film may be encoded and the camera may then make corrections to exposure based on the current date of exposure compared to the encoded data which may include degradation characteristics and manufacturing date. Information specifically for use by the cameraman or cinematographer may also be written onto the film and then this information may be displayed by the camera display to inform the cameraman or cinematographer of information regarding the film.

In accordance with one preferred embodiment, the pre-processing machine readable encoded markings may be written to the film in a manner in which it is perfectly synchronized with a latent image of the encoded markings. Such embodiment is particularly useful for recording KEYKODE information, such that the same number represented by the pre and post processing readable information refer to the exact same film frame and perforation identification. This can be done, e.g., in the following ways:

1) writing the pre-processing readable encoded information on either the emulsion or backside of the film in the same location of the latent image written encoded information, but in a manner in which it is removed during processing such that it is not visible after processing in order to keep it from hindering the reading of the latent image optically written encoded information;

2) writing the pre-processing readable encoded information on either the emulsion or backside of the film in a manner which remains machine readable after processing but is located in a distinct, but synchronized position on the film such that it does not impact the readability of the latent image optically written post process readable encoded information.

The latent image optically written encoded information may be written along with the pre-processing readable encoded information markings during the film manufacturing operation, or alternatively the latent image encoded information may be written in a film camera. In such alternative embodiment, the pre-processing readable encoded information may be read in the camera, and then re-recorded in the film as a latent image by an optical writer, such as used to record an in-camera timecode. Where the pre-processing readable encoded information remains readable after processing and is "printable" (i.e., is imagewise recorded in a print film when making a print of the negative), the conventional optically written encoded information may alternatively be omitted. In addition to re-recording the pre-processing readable encoded information in latent image form, further information which is a function of or derived from the decoded information may also advantageously be recorded in the camera.

Figure 2:
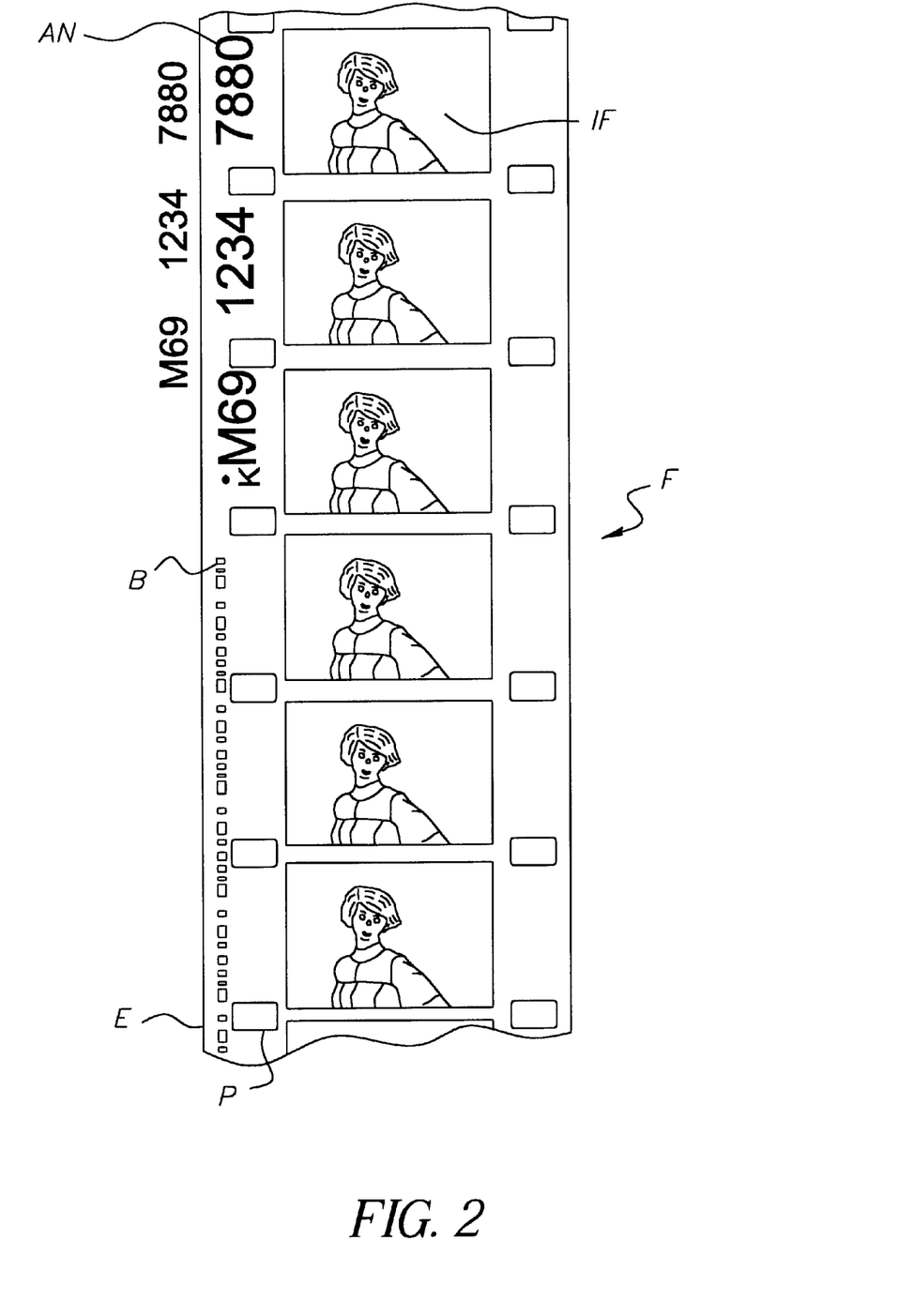
FIG. 2 is a schematic illustration of a potion of motion picture film having encoded and image information recorded therein.

To be compatible with existing motion picture latent image encoded information systems, systems which provide for machine readable encoded information markings on motion picture film which can be read and decoded in a camera should preferably meet the following criteria:

1. The code is written in a manner that allows for reading and decoding in the motion picture camera at rates varying from 1 to 500 frames/sec;

2. The code is written in a universally acceptable format (e.g., standard bar-code USS 128) such that standard bar-code decoder software can be utilized to convert the code into a digital form such that it may be transmitted as a standard video NTSC, PAL or HDTV signal;

3. The code is written in a manner that does not require use of the visible light spectrum such that it is not dependent on the film development step to render a machine readable image;

4. The code is written in a manner that enables exact reference to the pre-processed machine readable code and the optically latent imaged code such that precise frame and perforation identification will be achieved between the two systems for synchronization of the EDL and negative cutting stages;

5. The code is written on the portion of the film between the perforations and the outside edge, such as bar-code B illustrated in FIG. 2 written between edge E and perforations P of film strip F. Also illustrated in FIG. 2 is image frame area IF and alphanumeric characters AN;

6. The code is written on the film in a manner to provide an ample signal/noise such that the reader can accurately and precisely interpret the code. Thus the methods used for writing such a code must produce continuous and explicitly decipherable bar-code lines with the correct on/off line density for accurate reading;

7. The code is written such that there is no impingement on either the optically latent imaged human or machine readable code nor any effect due to scatter or blooming on the image recording portion of the film that could hinder the latent image capability;

8. The code is written in the natural process of motion picture film manufacturing at industry competitive slitting and perforation speeds; and 9. Contactless access of the encoded information in the bar-code reader is achieved.

In accordance with one embodiment of the invention, the technique of laser ablation of either the backside or emulsion side coatings of a motion picture film can be utilized to write the machine readable encoded information (e.g., bar-code) in a manner that can be read in the camera according to the requirements outlined above. A high energy laser, e.g., can be used to write a standard (e.g., USS 128) bar-code by ablating away either the emulsion layer or the backside, remjet layer. If written on the backside of the film, the laser will ablate away the carbon black containing remjet antihalation layer in a position between the perforation and outer edge of the film. This will leave a one or two dimensional bar-code or grey scale pattern resulting in minus density bar-code lines between the high density carbon based remjet coating. The difference in density between the low (ablated lines) and high (remaining remjet coating) density areas shall be sufficient in order to provide a proper signal to noise ratio for a reader mounted in the pre-exposure film path of the camera to accurately read and interpret the bar-code. Upon processing of the film, the remainder of the remjet film coating will be removed in the standard "remjet removal stage" of the film processing. It is in the design of this system that the optical density of ablated area shall preferably be close to that of the non ablated area after removal of the remjet in processing such that there is no readily visible indication of the ablated code. Another embodiment of this invention is to ablate the emulsion side coating of the photographic film with the same type of laser device in film manufacturing. Similarly, the ablation of the emulsion to the base layer will result in a density difference between the low (ablated) and high (emulsion) density portions such that the code may be read in a transmitted reader.

The difficulty encountered in the first embodiment is to write the barcode in a manner that provides the proper signal/noise for accurate reading in a transmitted light reader without causing an interaction between the laser and the carbon coating of the remjet laser resulting in phosphorescent light which may cause latent image fogging of the emulsion layers either compromising the image area sensitivity or the signal/noise of the bar-code signal. This is accomplished by very accurate control of the laser energy output, spot size and an ambient cooling system inherent in the laser imaging system. A similar difficulty is encountered in the second embodiment when ablating the emulsion side of the film with a laser. Again, great care must be taken to control heat and visible light generation such that fogging of the emulsion layer does not occur while at the same time producing a strong enough signal/noise for accurate machine reading of the bar-code. This is also accomplished with accurate control of the energy, spot size and travel rate of the laser beam during the writing process. Positive air flow in the laser device may be used to keep small remjet and emulsion layer particles produced during the ablation process away from the film during the wind-up stage. Specific laser imaging apparatus employing such air flow is disclosed, e.g., in copending, commonly assigned U.S. patent application Ser. Nos. 09/490,513 "Apparatus for Laser Marking Indicia on a Photosensitive Web" and 09/490,914 "Nozzle Element Adaptable to a Laser Beam Tube Used in Laser Edge Marking Equipment", the disclosures of which are incorporated by reference herein.

To provide both pre-processing readable encoded information markings and conventional post-processing readable latent imaged information, e.g., the pre-processing readable code may be written on the backside of the film while simultaneously exposing the latent imaged code information using conventional exposure techniques. Alternatively, in accordance with a preferred embodiment a non-visible light (e.g., infrared) laser system may be used to ablation mark an opaque backing layer (e.g., the carbon black containing remjet layer) without creating any light to expose the film emulsion, and the markings created in the backing layer may then be used as a mask for a subsequent "white" light (or another appropriate light source) exposure, wherein the emulsion is exposed through the laser ablated markings and support by illuminating the backing layer side. Where the backing layer has been removed then the emulsion will be exposed therefore creating a duplicate latent image (corresponding exactly to the ablation markings in the backing layer) in the film emulsion.

Laser types which may be used to form pre-processing readable encoded information markings in the form of ablation marks on motion picture films in accordance with one embodiment of the invention include, e.g.:

1. $CO_2$ RF Excited Laser;
2. $CO_2$ DC Excited Laser;
3. $CO_2$ TEA Laser;
4. Nd:YAG Arc Lamp pumped Q switched Laser (including harmonics of such laser);
5. Nd:YAG Diode Pumped Laser (including harmonics of such laser);
6. Ytterbium Fiber Diode Pumped Laser (including harmonics of such laser);
7. Argon Laser; and
8. Excimer Lasers (all types of).

Possible laser marking system configurations include:
1. Dot Matrix Marking Systems (Multiple Lasers, Acousto-optically scanned, polygon scanned), employing, e.g., $CO_2$ RF xDC excited lasers or optionally laser types 4–7 above;
2. Flying Spot Scanning Systems, employing, e.g., $CO_2$ RF excited or laser types 4–7 above; and
3. Stencil Mask Imaged Systems, employing, e.g., $CO_2$ and Excimer Lasers.

Representative laser system parameter ranges which may be useful for marking photographic films in accordance with the invention include:

1. Wavelengths from deep UV to Mid IR;
2. Pulse Width from 10 ns to CW (continuous wave);
3. Power from 100 mW to 100000 watts;
4. Energy from 1 mJ to 100 mJ;
5. Frequency from 100 MHz to CW; and
6. Scan Velocity from 0.1 meters/second to 50 meters/second.

Preferred laser systems include Q-switched Nd:YAG Flying Spot Marking System and $CO_2$ RF excited Dot Matrix Marking System employing multiple lasers.

Particularly preferred laser systems include Domino Amjet's Model DDC2, which comprises seven 30 watt $CO_2$ lasers which are focused in a line orthogonal to the direction of web translation. These lasers are pulsed on and off to vaporize a 5×7 dot matrix of programmable characters in the edge of the web with the following set-up:

Marking Location—over a roller
Wavelength of laser light: 10.6 micron–9.3 micron
Pulse width of laser: 20 microseconds–100 microseconds
Focused Spot Size: 85 microns
Optical power density at the focused spot: 530 $KW/cm^2$
Energy delivered at nominal 50 s pulse width: 1.5 mJ
Energy density at the focused spot (nominal 50 s pulse width): 26 $J/cm^2$ The commercially available version of Model DDC2 provides a velocity capability of from less than 0.00001 ft/m to 3000 ft/m and a character height range of from 0.030–0.065 inch. To provide bar-code heights of less than 0.030 inch as may be desired, e.g., for marking 16 mm film (ANSI/SMPTE Standard 271-1994 specifies a bar-code height of 0.0188 +/−0.0030 inch), additional lenses may be employed in combination with such commercially available laser marking systems (i.e., an image masking device may be employed at the normal focal plane of the commercially available system, and the mask image may then be focused onto the film to be marked with an additional lens).

In accordance with another embodiment of the invention, the pre-process machine readable encoded information markings may be written using an ink jet writing system. These systems may utilize, e.g., an infrared readable ink that may applied to either the backside or emulsion side of the film. The ink application must be achieved such that:

1) the ink is supplied with sufficient density such that the machine reader can accurately distinguish between the printed code (e.g., bar-code) image and the film emulsion or backside;
2) if the image is process surviving it must be located on a portion of the film where there is no interference with the reading of the optically latent image written encoded information; and
3) the image may be written in the location of the optically latent imaged encoded information only if it is entirely removed during the film processing stage such that there is no remaining ink image to interfere with the developed human or machine readable latent imaged optical code.

Ink jet printers can print a variety of bar-code symbologies on a variety of substrates with a variety of inks at a variety of resolutions. Most bar-code symbologies can be printed since an ink jet printer can print a dot matrix raster pattern. The only restrictions are the size of the pattern (dots high by dots wide). Also the size of the printed dot will affect the size of the final printed bar-code. Printing on photographic film has special requirements. First the ink must not be photographically active to the film. Also the ink must have proper adhesion characteristic to the film surface being printed. The ink must have the proper optical properties so as to allow the reading of the ink jet printed code with a light wavelength that will not expose the film. Typical wavelengths range from 800–950 nm. An ink will contain some compound that allows it to absorb the light. This compound may be a carbon or infrared adsorbing dye.

Figure 3A:
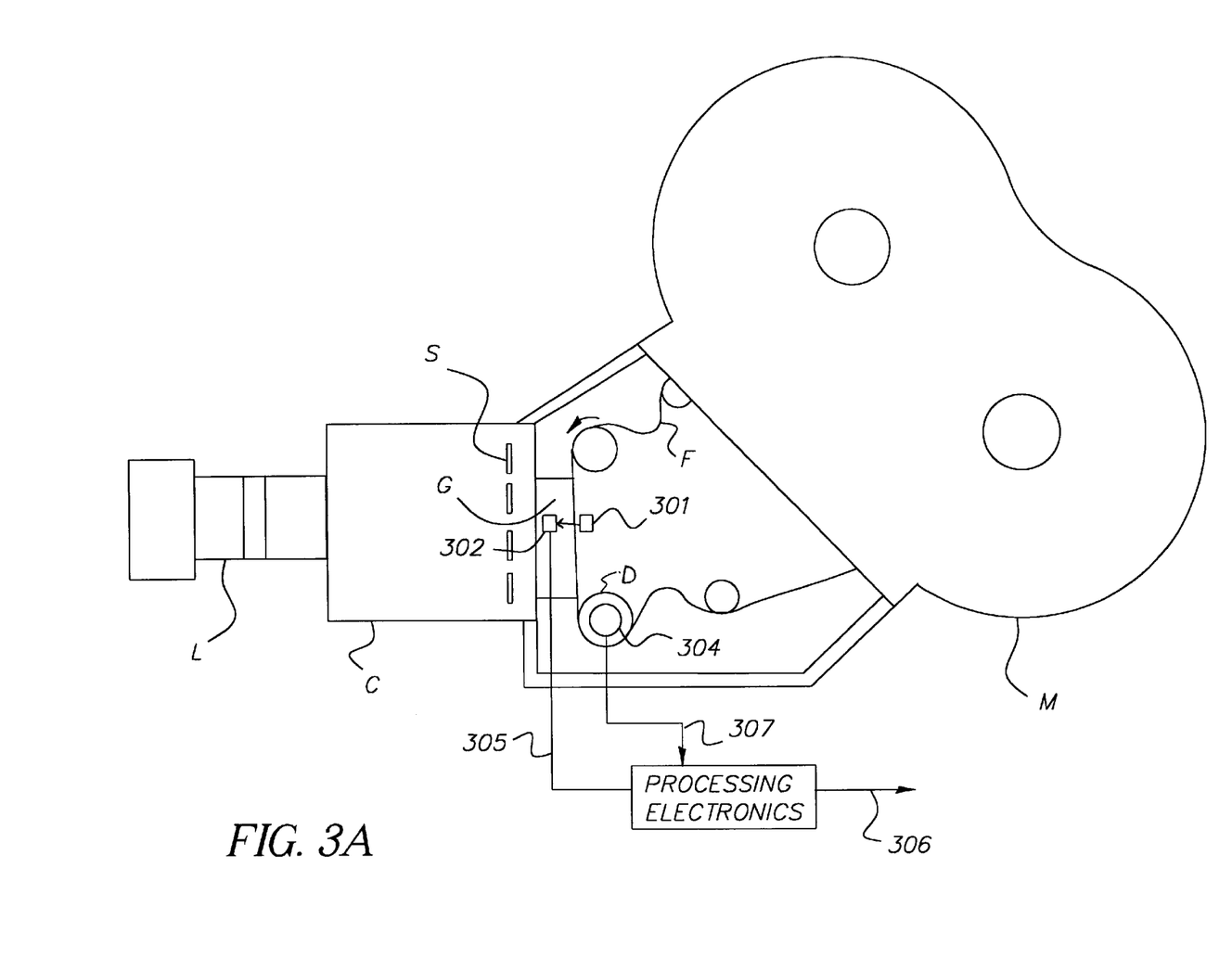
FIG. 3A is a schematic illustration of a motion picture camera having a pre-processing readable encoded information reader positioned in transmission mode.
Figure 3B:
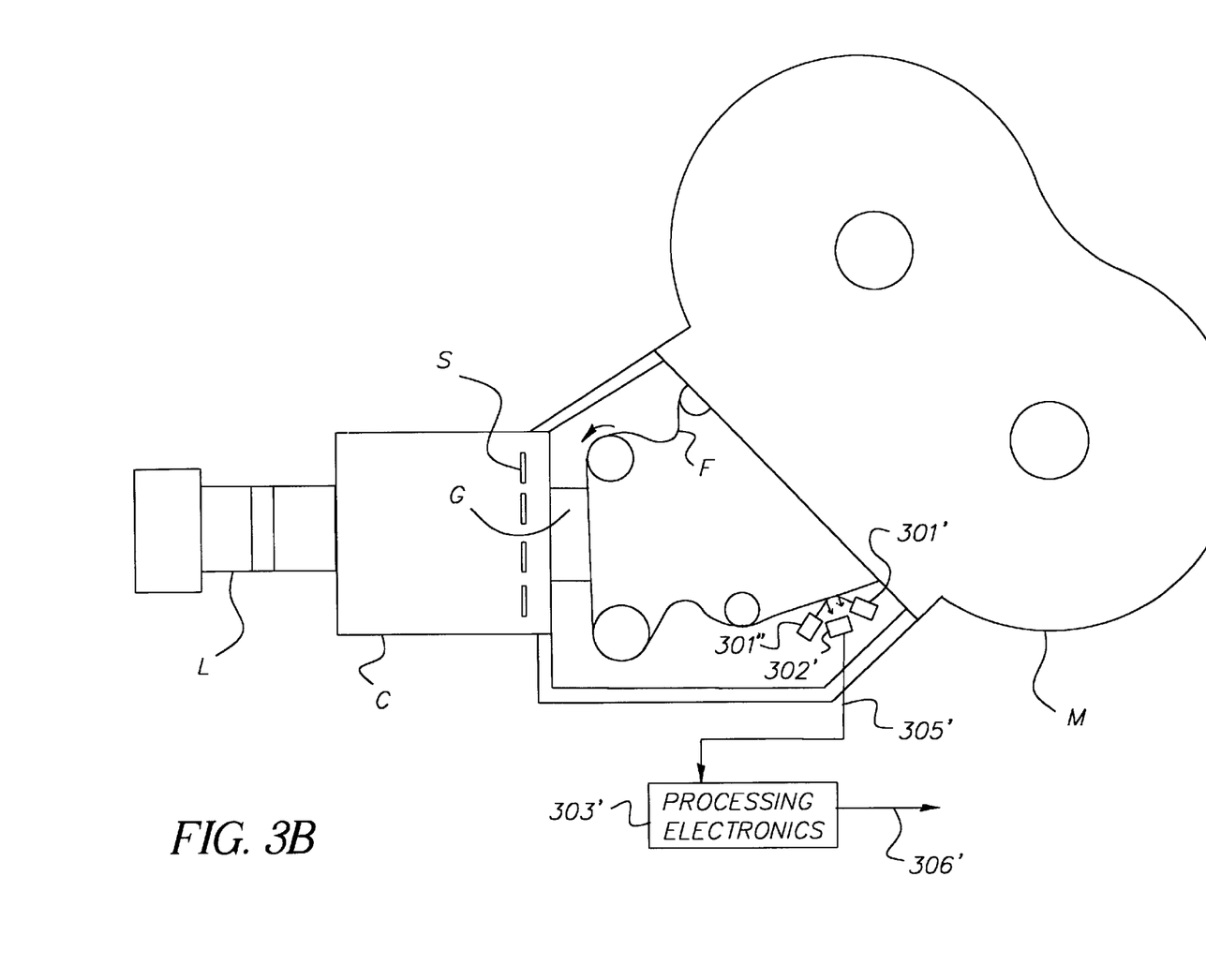
FIG. 3B is a schematic illustration of a motion picture camera having a pre-processing readable encoded information reader positioned in reflective mode.

Reading of a bar-code marked on film can be done by two methods, one is via the use of transmitted light and the other is via the use of reflected light. In accordance with one embodiment of the invention, conventional barcode readers employing infrared light sources (to avoid exposure of visible light sensitive film) may be employed in the film path of an otherwise conventional motion picture camera, such as schematically illustrated in FIGS. 3A and 3B. In such figures, film F is fed continuously from film magazine M to film gate area G, where it is intermittently rapidly advanced and then stopped during actual exposure of each film frame through camera body C and lens L. Shutter S prevents light from exposing the film during advancement of the film from frame to frame through the film gate area. Details of the camera film transport and exposure mechanisms are well known in the camera art and are not specifically illustrated.

When transmitted light is used as illustrated in FIG. 3A, a light source 301 (such as an LED or IR laser diode) emits a light from one side of the film and a photo detection system sensor 302 (such as a CCD sensor) is on the other side of the film detecting the amount of light passing through the film. As the film passes between the light source and detector, the amount of light passing through the film changes based on density of the film. A bar-code printed on the film will cause the overall density of the film to change based on the method of creating the bar-code. A laser marking system will ablate portions of the film thus reducing the density of the film where portions of it have been removed. Therefore the laser ablates portions of the film to create the "spaces" (reduced density) of the bar-code and the areas not ablated are the "bars". When ink jet is used to print the bar-code the ink jet ink has light absorption capabilities. Therefore the "bars" of the bar-code are printed with the ink creating an area where the ink has been printed with higher density. The output of the sensor 302 on line 305 is decoded by the barcode reader processing electronics 303, to provide, e.g., film frame or other desired recorded information on line 306. If the overall background density changes enough then a special reader as described in U.S. Pat. No. 6,095,417 can be used. The space and bar densities may be reversed if the processing electronics decoding algorithm is so capable.

Reflected diffuse light can also be used to read bar-codes. As illustrated in FIG. 3B, one or more light source(s) 301', 301" located on the same side of the film as a photo detector system sensor 302' illuminates the area of the film that the photo detector sensor is receiving. To read a bar-code the film surface must have different reflectance characteristics with the spaces have more reflectance than the bars. To create this reflectance difference a laser or ink can change the reflectance characteristics. The laser can ablate or modify the surface such that the film reflectance has changed. This change could result in the modified areas having increased or decreased reflectance in comparison to the unmodified areas. An ink jet printer could print with an ink that has more or less reflectance than the surrounding unprinted areas. The output of the sensor 302' on line 305' is decoded by the barcode reader processing electronics 303', to provide the recorded information on line 306'.

Light sources 301, 301', 301" and sensors 302, 302' as depicted in FIGS. 3A and 3B may be positioned within or outside the camera film gate area G, for either transmission or reflection reading modes. When positioned outside the film gate area, the reader may conveniently simply employ a single sensor which reads the encoded information as it transported past the sensor at a constant speed. When located within the film gate area of a motion picture camera, the reader may employ a single sensor to read the encoded information as it transported pass the sensor, or employ an array of CCD light sensitive elements to sense the pattern encoded on the film while the film is intermittently stopped during exposure of a frame. When a single sensor is employed within the film gate area as illustrated in FIG. 3A, it may be advantageous to additionally employ a shaft encoder 304 connected to a film transport drum D driven by the film motion to sense the instantaneous speed and position of the film. Shaft encoders produce pulses on line 307 at fixed angular increments which may serve as clocking pulses to enable the code reader electronic processing circuits 303 to determine the instantaneous velocity of the film and the spacial relationship on the film of the signal produced by the sensor 302.

The following examples demonstrate the recording and reading of laser marked and ink jet printed bar-codes on unprocessed photographic films with transmitted and reflected light bar-code readers. In all cases, marking was done on samples of Eastman Color Negative 5279 camera origination film, either on the emulsion layer side or remjet backing layer side.

Laser Marking Examples:

A multiple laser head (7 lasers) high speed dot matrix $CO_2$ laser printer (DDC2 manufactured by Domino Lasers as described above) was employed to mark a Interleave 2 of 5 bar-code and a human readable text on the edge of the test film. Samples were prepared by marking the each side of the film.

A 100 watt $CO_2$ laser manufactured by Synrad Lasers, Inc. coupled with a ScanLab high performance galvanometer scanner was employed to mark bar-codes on each side of the film. A 100 mm pre scan focusing objective was used with a 3x beam expander causing the focused spot size to be about 200 microns in diameter. A similar $CO_2$ laser scanner was tried with a lower power Synrad laser (25 watts). The results were the same as that of the 100 watt system.

A 70 watt arc lamp pumped Nd:YAG laser (Neodymium doped yttrium aluminum garnet) was used in conduction with a General Scanning model G4 high performance scanner. The beam was expanded four times and focusing was done with a flat field corrected post scan objective causing the focused spot size to be about 100 microns in diameter. A Interleave 2 of 5 barcode was marked on the backside (remjet side) of the test film.

A Welch Allyn, Inc. reading system was used to read the above described laser marked bar-codes. The reading system consisted of a ScanTeam 1100 Bar-code Terminal with a ScanTeam 6500D Fixed Mount Stationary Beam Scanner with a 6x20 mil diamond aperture. The illuminating LED's in the scanner were disconnected. A Siemens SFH401-3 LED was used to as a reading light source. The light source was placed on the opposite side of the film as the scanner (reading bar-codes in transmission mode).

Laser ablated bar-codes marked on the remjet side were also read using a Datalogic F30I-111 Fixed-Position Scanner and a Welch Allyn ScanTeam 1350-122001 terminal. This is using the internal light source of the scanner to illuminate the bar-code therefore reading in a reflective mode, with the remjet side facing the scanner. The "not" output of the scanner was used as the input to the terminal.

Laser ablated bar-codes marked on the remjet side were also read using a Datalogic F30I-111 Fixed-Position Scanner, Welch Allyn ScanTeam 1350-122001 terminal and a General Electric 55C Infrared LED. This configuration did not use the internal light source of the scanner to illuminate the bar-code, but instead used the LED to illuminate the side of the film opposite of the side facing the scanner in a transmission mode. It does not matter which side of the film is facing the scanner. The "not" output of the scanner was used as the input to the terminal.

Ink Jet Printer Marking Examples:

A ten digit interleaved 2 of 5 bar-code was printed on the emulsion layer side of Eastman 5279 film using a Marconi Data Systems, Inc. Model EXCEL/UHS/ESI ink jet printer using Model 162000 ink. The bar-codes were verified using a PSC, Inc. Model Quick Check 650 verifier using two pens, 10 IR and 5 IR. The following quality grade was obtained from each pen: C/10/940 and C/5/940. Verifier was set to ANSI parameters.

Inkjet bar-codes marked on the emulsion side with a Marconi Data System Excel 170i Ultra High Speed ink jet printer using 16-2000 ink were also read using a Datalogic F30I-111 Fixed-Position Scanner and a Welch Allyn ScanTeam 1350-122001 terminal. This is using the internal light source of the scanner to illuminate the bar-code therefore reading in a reflective mode, the emulsion side facing the scanner. The standard output of the scanner was used as the input to the terminal.

Inkjet bar-codes marked on the remjet backing layer side with a Marconi Data System Excel 170i Ultra High Speed ink jet printer using 16-2000 ink were also read using a Datalogic F30I-111 Fixed-Position Scanner, Welch Allyn ScanTeam 1350-122001 terminal, and a General Electric 55C Infrared LED. This configuration did not use the internal light source of the scanner to illuminate the bar-code but used the LED to illuminate the side of the film opposite of the side facing the scanner, transmission mode. It does not matter which side of the film is facing the scanner. The standard output of the scanner was used as the input to the terminal.

In accordance with a further embodiment of the invention, encoded information may be marked in a photographic film to provide pre-processing readable markings by embossing the film, e.g., during the slitting or punching operations, with a pattern that has a binary optic form. This pattern allows binary encoding on the film. The embossed pattern may be sensed by light from a small illuminator positioned within the camera. This light is redirected or refracted by the binary optic pattern on the film. A small sensor or sensors in the camera detect the light after it is being scattered or re-directed by the binary optics. The sequence of light sensed forms a code. Once the code is converted to electrical signals, it can be decoded using electronics to produce the desired code (e.g., film code and frame number) information.

By binary optic is meant a holographic like pattern which, for example, acts like a diffraction grating to redirect light from a light source which preferably has a narrow spectral range. Examples of such light sources include an LED or laser diode. Incandescent light sources or other sources may also be used.

A further method involves encoding by embossing patterns on the film, which are sensed by a stylus as the film moves passed.

Figure 4:
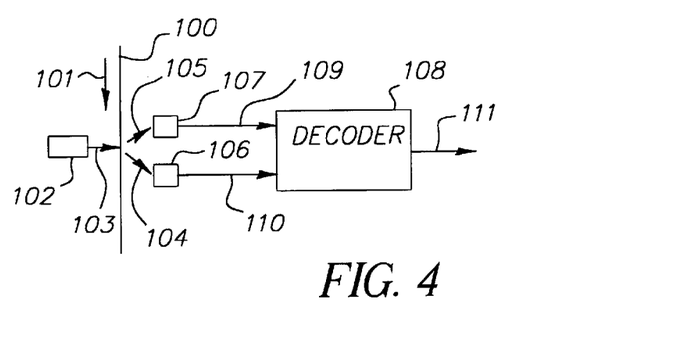
FIG. 4 depicts apparatus, in schematic form, for sensing binary optic encoded data on film in accordance with one embodiment of the invention.

FIG. 4 shows a means for sensing binary optic encoded data on film in a motion picture camera. Film 100 moves in direction 101 and an IR light source 102 of frequency that is both transparent to the film and does not significantly expose the film, illuminates the film with beam 103. Depending on the encoded surface on film 101 light is scattered in either direction 104 or 105 to sensor 106 or sensor 107 depending on the direction of scatter. Data from sensors 106 or 107 pass to decoder 108 along lines 109 and 110. Decoder 108 produces on line 111 data indicating, e.g., the current frame number and film identifier.

A further alternative approach is to emboss patterns on the film that have a reflective characteristic. In this case, the light source and sensors will be on the same side of the film and the frequency of illuminating light used does not need to be transparent to the film.

If the pattern is positioned outside the image area on the film, it does not matter if the illuminating light source does slightly expose the film.

Figure 5A:
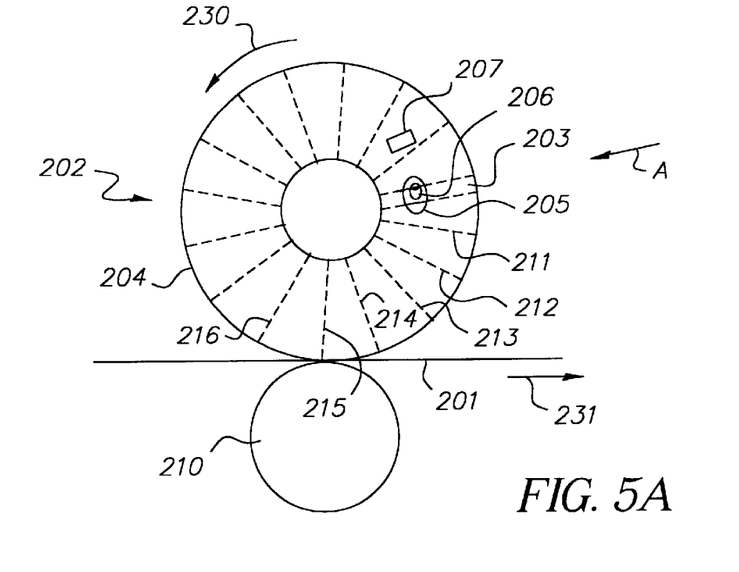
FIG. 5A depicts, in schematic form, an embossing wheel 202 for recording binary optic encoded data in a film.

Means for writing the binary optic code is shown in FIG. 5A, where the film 201 after slitting and possibly after perforation but before packaging passes in direction 231. A wheel 202 turns in direction 230, and contains radial shafts for example 203 which protrude from or are flush with the rim 204 and holes for example 205 which allow pegs 206 on the shafts for example 203 to protrude through the holes. These pegs can be engaged by arm 207 so that if the arm is held stationary as hole 205 of the wheel rotates past arm 207, arm 207 can deflect peg 206 causing the shaft 203 to rotate over an angle in the range of 60 to 120 degrees.

Figure 5B:
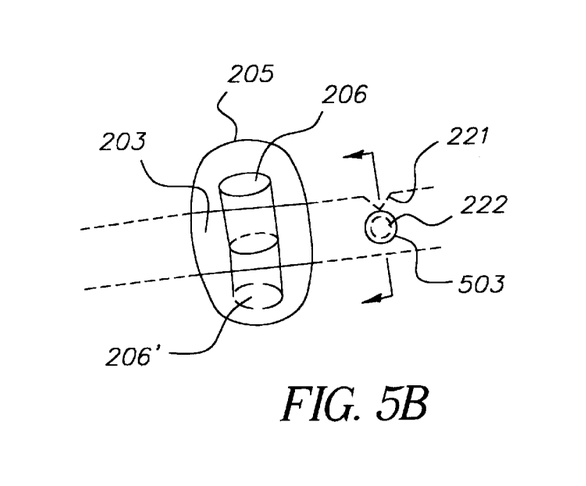
FIG. 5B depicts a magnified view of a section of the embossing wheel 202 of FIG. 5A.

FIG. 5B shows a magnified view of hole 205 with shaft 203 visible through the hole and peg 206 being in an upward position. If arm 207 is held stationary as hole 205 rotates past, it will deflect peg 206 to the downward position 206' that is shown dotted in FIG. 3. Alternatively, if arm 207 is not stationary but moving (see FIG. 5E) more quickly than the peg 206 is moving as a result of the rotation of wheel 202, then peg 206 will remain in the upwards position.

Figure 5C:
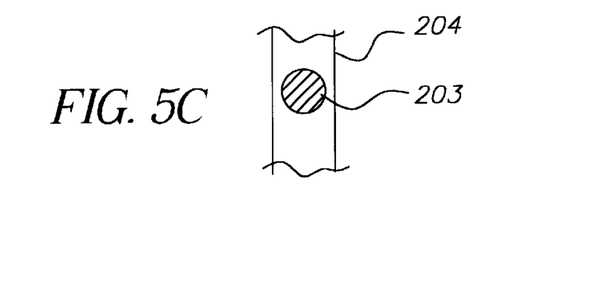
FIG. 5C depicts a side view of a portion of the embossing wheel of FIG. 5A.

FIG. 5C shows a view of wheel 202 of FIG. 5A in direction A. Shaft 203 protrudes through the wheel in such a way that at the end of 203 is flush with or slightly raised from rim 204 of the wheel. On the end of shaft 203 is encoded a binary optic pattern and the angle of that pattern as it is embossed in film 201 is determined by the position of peg 206, which controls the angle of orientation of the shaft 203. The angle of the pattern thanks to the design of the binary optic pattern determines whether light from light source 102 will passes through the film in direction 105 or 104 as illustrated in FIG. 4.

Embossing of film 201 by wheel 202 may be performed simply with pressure, and to sustain the pressure a backing wheel 210 may be used. Alternatively, the rim 204 of wheel 202 may be heated either by induction heating or by using resistive elements in the rim of the wheel. A temperature controller sends energy to the rim such that the temperature of the rim and the ends of the shafts is maintained at a level which embosses the film with the binary optic pattern. Alternatively, the shafts may be thermally insulated from wheel 202 and the temperature of the shafts may be accurately controlled.

As FIG. 5A shows diagrammatically, other shafts are also positioned within the wheel at positions shown as dotted lines shown as 211, 212, 213, 214, 215, 216 and so on. These shafts are so arranged so that there is a sufficient number of shafts within the wheel (each of whose angular position or peg is independently set) to perform the writing of codes having sufficient precision and range to represent the entire range of desired codes.

Figure 5D:
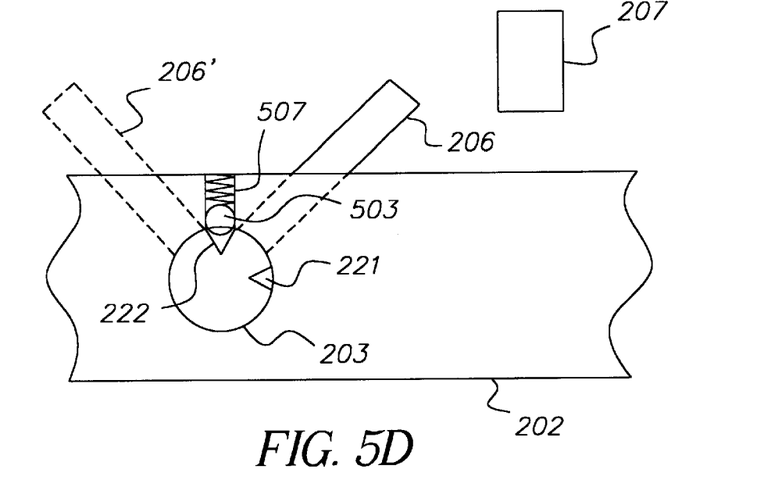
FIG. 5D depicts a side view of the section of the embossing wheel which is illustrate FIG. 5B.

As shown in FIGS. 5B and 5D, a spring 507 loads detent ball 503 so that small depressions 221 and 222 in shaft 203 maintain the shaft in the angular position set by arm 207 until pin 206 is moved when it next strikes arm 207. FIG. 5D shows this in more detail. It is a view of FIG. 5B in direction BB. Shaft 203 in wheel 202 has indents 221 and 222. Ball 503 holds the shaft in the angular position controlled by pin 206 striking arm 207. Pin 206 protrudes from hole 205. Dotted line 206' corresponds to the alternative position of pin 206.

Figure 5E:
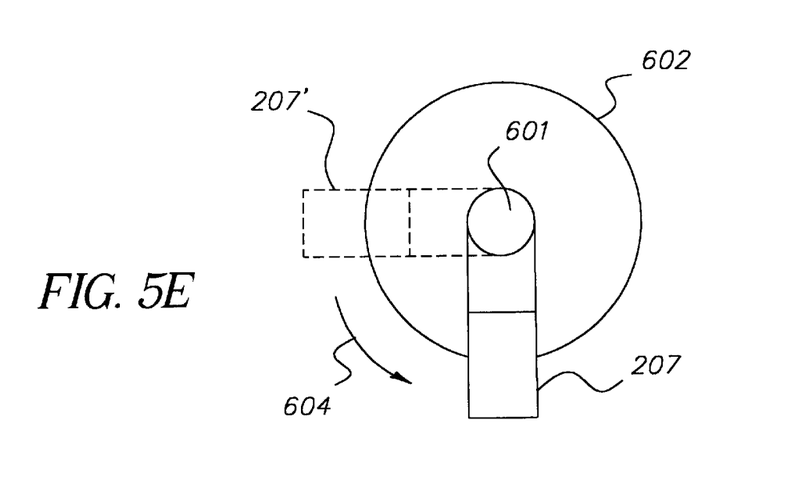
FIG. 5E depicts the arrangement of supporting arm 207 of the embossing wheel 202 of FIG. 5A.

FIG. 5E, which is viewed in the same direction as FIG. 5D, shows the arrangement of supporting arm 207. Arm 207 is mounted on shaft 601. Also mounted on this shaft and controlling its position is rotary solenoid 602. If it is desired to set peg 206 on shaft 203 in position 206', then shaft 207 is maintained in the position where it is shown in solid lines so that will deflect peg 206 as it passes by arm 207 due to the rotary motion of wheel 202, so that detent ball 503 is positioned depression 221. If it is desired to move shaft 203 and peg 206 from the position as shown in FIGS. 5B 5D as dotted lines (206') to the position as shown as solid lines, then rotary solenoid 602 positions arm 207 in the dotted position 207', and as the peg in position 206'on wheel 202 passes beneath the arm in position 207' due to the rotary motion of wheel 202, solenoid 602 is activated and arm 207 swings down in direction of arrow 604. Consequently, the peg in position 206' is knocked or struck by arm 207 and moved into position shown solid in FIG. 5D as 206.

Figure 6:
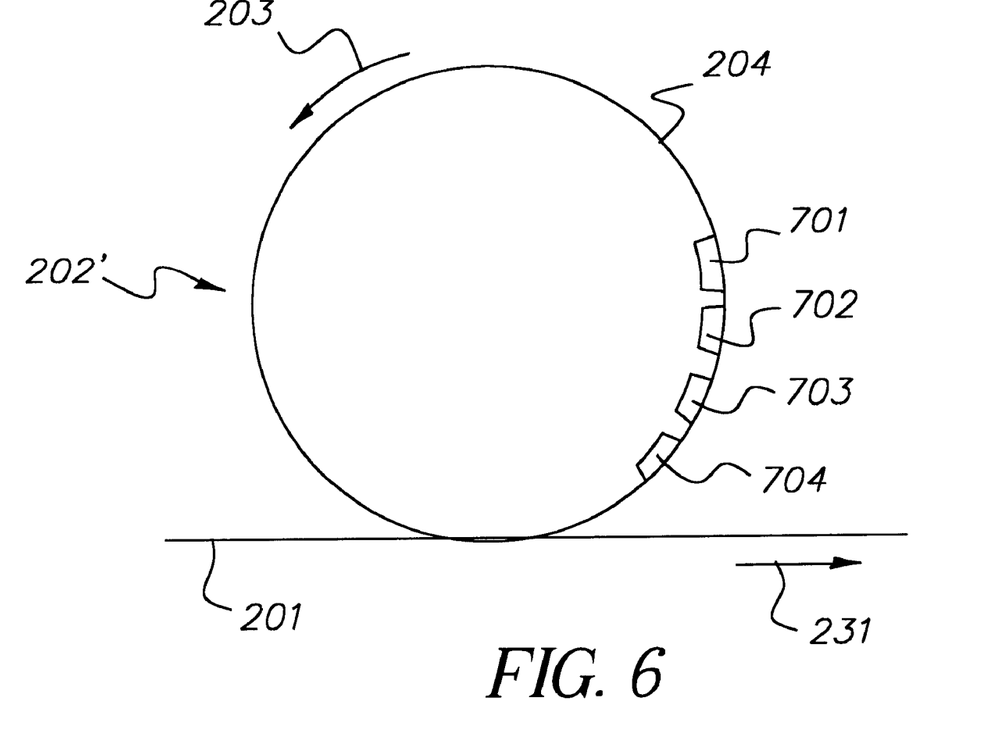
FIG. 6 depicts, in schematic form, an embossing wheel 202' for recording encoded data in a film.

An alternate method of encoding the patterns on film 201 is to use, as shown in FIG. 6, heated areas on the rim 204 of an embossing wheel 202'. These areas for example 701, 702, 703, 704 and so on, are heated by heating elements within the wheel. Consequently, if it is desired to emboss the binary optic pattern associated with each of these elements on film 201 then the element is heated either resistively or inductively to a temperature that can emboss film 201.

Some encoding methods may require a length greater than one frame spacing to record an entire code. In this case, not all frames may be numbered and the individual frame numbers may be created by an incremental coding or by having the camera count from distances from a reference position associated with each complete code.

The invention has been described in detail with particular reference to certain preferred embodiments thereof, but it will be understood that variations and modifications can be effected within the spirit and scope of the invention.

What is claimed is:

1. A camera origination photographic film comprising pre-processing readable encoded information markings recorded thereon, and latent image post-processing readable encoded information markings recorded in the photographic film which are synchronized with the pre-processing readable encoded information markings.

2. A camera origination film according to claim 1 wherein the pre-processing readable encoded information comprises laser-ablated markings on the film.

3. A camera origination film according to claim 2, wherein the film comprises a transparent support, an emulsion layer coated on one side of the support, and an opaque backing layer on the opposite side of the support, and the pre-processing readable encoded information comprises laser ablated markings in the backing layer.

4. A camera origination film according to claim 1 wherein the pre-processing readable encoded information comprises ink-jet printed markings on the film.

5. A camera origination film according to claim 1, wherein the pre-processing readable encoded information comprises binary optics embossed markings on the film.

6. A camera origination film according to claim 1, wherein the film comprises a transparent support, an emulsion layer coated on one side of the support, and a backing layer on the opposite side of the support, and the pre-processing readable encoded information is marked on the emulsion layer side.

7. A camera origination film according to claim 1, wherein the film comprises a transparent support, an emulsion layer coated on one side of the support, and a backing layer on the opposite side of the support, and the pre-processing readable encoded information is marked on the backing layer side.

8. A camera origination photographic film comprising pre-processing readable encoded information markings recorded thereon, wherein the film comprises a transparent support, an emulsion layer coated on one side of the support, and an opaque backing layer on the opposite side of the support, and the pre-processing readable encoded information comprises laser ablated markings in the backing layer, further comprising encoded information recorded in the emulsion layer in the form of a latent image synchronized with the pre-processing readable laser ablated markings.

9. A camera origination film according to claim 8, wherein the latent image encoded information is recorded by using the laser ablated markings in the backing layer as a mask and exposing the emulsion layer through the mask and transparent support.

10. A system for encoding motion picture film with information for use in a motion picture camera such that the camera can read encoded information prior to film processing when the film is in the camera, comprising
    (i) camera origination film having pre-processing readable encoded information markings thereon wherein the information markings comprise laser ablation, inkjet printing, or holographic or binary optic embossing markings, and
    (ii) a motion picture camera having a reader for reading the pre-processing readable encoded information markings.

11. A system according to claim 10, wherein the pre-processing readable encoded information comprises bar-code markings on the film and the reader comprises a bar-code reader.

12. A system according to claim 11, wherein the pre-processing readable encoded information comprises laser-ablated markings on the film.

13. A system according to claim 12, wherein the film comprises a transparent support, an emulsion layer coated on one side of the support, and an opaque backing layer on the opposite side of the support, and the pre-processing readable encoded information comprises laser ablated markings in the backing layer.

14. A system according to claim 11 wherein the pre-processing readable encoded information comprises ink-jet printed markings on the film.

15. A system according to claim 10 wherein the pre-processing readable encoded information comprises binary optics embossed markings on the film.

16. A system according to claim 10, wherein the film comprises a transparent support, an emulsion layer coated on one side of the support, and a backing layer on the opposite side of the support, and the pre-processing readable encoded information is marked on the emulsion layer side.

17. A system according to claim 10, wherein the film comprises a transparent support, an emulsion layer coated on one side of the support, and a backing layer on the opposite side of the support, and the pre-processing readable encoded information is marked on the backing layer side.

18. A system for encoding motion picture film with information for use in a motion picture camera such that the camera can read encoded information prior to film processing when the film is in the camera, comprising (i) camera origination film having pre-processing readable encoded information markings thereon and (ii) a motion picture camera having a reader for reading the pre-processing readable encoded information markings, wherein the film comprises a transparent support, an emulsion layer coated on one side of the support, and an opaque backing layer on the opposite side of the support, and the pre-processing readable encoded information comprises laser ablated bar-code markings in the backing layer and the reader comprises a bar-code reader, and further comprising encoded information recorded in the emulsion layer in the form of a latent image synchronized with the pre-processing readable laser ablated markings.

19. A system according to claim 18, wherein the latent image encoded information is recorded by using the laser ablated markings in the backing layer as a mask and exposing the emulsion layer through the mask and transparent support.

20. A method for encoding light sensitive motion picture photographic film with pre-processing machine readable information, comprising physically marking the film with encoded information using laser ablation, inkjet printing, or holographic or binary optic embossing, and further comprising recording latent image post-processing readable encoded information markings in the photographic film which are synchronized with the marked pre-processing readable encoded information.

21. A method according to claim 20, wherein the film is physically marked with pre-processing readable encoded information which comprises bar-code markings on the film which may be read with a bar-code reader.

22. A method for recording synchronized pre-processing readable marks and latent image marks in a photographic film which comprises a transparent support, an emulsion layer coated on one side of the support, and an opaque backing layer on the opposite side of the support, the method comprising (i) laser ablation marking the backing layer to form a pre-processing readable mark, and (ii) exposing the emulsion layer through the transparent support using the ablation marking of the backing layer as a mask to form a latent image in the emulsion layer which corresponds to the ablation marking in the backing layer, which latent image becomes readable after photographic processing.

* * * * *